US012583238B2

(12) United States Patent
Park

(10) Patent No.: US 12,583,238 B2
(45) Date of Patent: Mar. 24, 2026

(54) PAPER SUPPLY CONTROL DEVICE

(71) Applicant: DS GLOBAL, Seoul (KR)

(72) Inventor: Kyoung Tae Park, Seoul (KR)

(73) Assignee: DS GLOBAL, Seoul (KR)

( * ) Notice: Subject to any disclaimer, the term of this patent is extended or adjusted under 35 U.S.C. 154(b) by 128 days.

(21) Appl. No.: 18/713,720

(22) PCT Filed: Dec. 1, 2021

(86) PCT No.: PCT/KR2021/017972
§ 371 (c)(1),
(2) Date: May 28, 2024

(87) PCT Pub. No.: WO2023/101041
PCT Pub. Date: Jun. 8, 2023

(65) Prior Publication Data

US 2025/0026137 A1 Jan. 23, 2025

(30) Foreign Application Priority Data

Nov. 30, 2021 (KR) ........................ 10-2021-0168984

(51) Int. Cl.
*B41J 11/04* (2006.01)
*B41J 11/00* (2006.01)
*B41J 29/38* (2006.01)

(52) U.S. Cl.
CPC ............ *B41J 11/04* (2013.01); *B41J 11/0005* (2013.01); *B41J 29/38* (2013.01)

(58) Field of Classification Search
None
See application file for complete search history.

(56) References Cited

U.S. PATENT DOCUMENTS

2009/0189342 A1 7/2009 Abe et al.

FOREIGN PATENT DOCUMENTS

| | | | |
|---|---|---|---|
| JP | 2020-146940 | A | 9/2020 |
| KR | 10-2000-0047108 | A | 7/2000 |
| KR | 10-2020-0097604 | A | 8/2020 |
| KR | 10-2021-0079594 | A | 6/2021 |

*Primary Examiner* — Alejandro Valencia
(74) *Attorney, Agent, or Firm* — NKL LAW; Jae Youn Kim

(57) ABSTRACT

The present invention relates to a paper supply control device and, specifically, to a paper supply control device which performs printing on printing paper by applying heat to an ink ribbon, performs de-curling with respect to the printing paper of which printing has been done, and then controls feeding and a transfer path of the printing paper so as to provide the printing paper to a user.

8 Claims, 23 Drawing Sheets

PAPER SUPPLY CONTROL DEVICE

TECHNICAL FIELD

The present invention relates to a paper feeding control device, more specifically to a paper feeding control device that is capable of controlling feeding and a transfer path of printing paper so that printing is done on the printing paper by applying heat to an ink ribbon, de-curling for the printing paper whose printing has been done is performed, and the printing paper is provided to a user.

BACKGROUND ART

As digital technologies have been recently developed, thermal transfer printers are becoming more and more popular to print the images taken through terminals on the spot or provide various printed materials as a part of terminal application services.

The thermal transfer printer applies heat to an ink ribbon through a thermal print head (TPH) and thus transfers the dye or pigment applied to the ink ribbon to printing paper fed therein.

A method for feeding the printing paper is classified into a method for feeding sheets of paper individually and a method for feeding printing paper by a given length in a state where the printing paper is wound to the form of a roll, and the roll type printing paper is typically wound on a cartridge and mounted in the thermal transfer printer.

After the cartridge has been insertedly mounted in the thermal transfer printer to feed the roll type printing paper, a printing process is performed, and the printing paper whose printing is done is cut by a cutter and then provided to a user through an exit hole.

Further, if the roll type printing paper is wound on the cartridge of the thermal transfer printer, a curl is formed on the printing paper in a winding direction of the printing paper, and therefore, de-curling through which the printing paper passes through a de-curler one or more times is performed, thereby providing the printing paper evenly unrolled.

Therefore, there is a need to develop a device for unwinding the printing paper from the cartridge, reciprocating the printing paper to the thermal print head, printing various colors on the printing paper, and performing de-curling for the printing paper, in processes of preparing printing and completing the printing, thereby efficiently controlling feeding and a transfer path of the printing paper.

DISCLOSURE OF THE INVENTION

Technical Problems

Accordingly, the present invention has been made in view of the above-mentioned problems occurring in the related art, and it is an object of the present invention to provide a paper feeding control device that is capable of controlling feeding and a transfer path of printing paper so that printing is done on the printing paper by applying heat to an ink ribbon, de-curling for the printing paper whose printing has been done is performed, and the printing paper is provided to a user.

Technical Solutions

To accomplish the above-mentioned objects, according to the present invention, there is provided a paper feeding control device for controlling feeding of printing paper in a thermal transfer printer, including: a driving gear having teeth formed along the outer periphery thereof in such a way as to engage with a motor gear; a driving shaft whose one side end portion fittedly coupled to a rotating center of the driving gear; a driven rotating plate having a rotating center to which the other side end portion of the driving shaft DR-X is fittedly coupled; a shaft gear having a rotating center through which the driving shaft fittedly passes in such a way as to rotate together with the driving shaft; an idle gear engaging with the shaft gear and thus rotating; a first cam coupled to the idle gear in such a way as to rotate together with the idle gear and adapted to change the rotational direction of a diverter selecting a transfer path of the printing paper according to the rotating angle thereof; a pair of second right and left cams located on one side of the driving gear and on one side of the driven rotating plate to perform the same operation as each other; a pair of third right and left cams located on the other side of the driving gear and on the other side of the driven rotating plate to perform the same operation as each other; a pair of platen brackets rotatably coupled to both ends of a platen roller in such a way as to allow an upper end portion thereof to rotate around a rotating center point formed on a lower end portion thereof by means of the second cams to operate the platen roller; and a pair of pressurizing brackets rotatably coupled to both ends of a pressurizing roller in such a way as to allow an upper end portion thereof to rotate around a rotating center point formed on a lower end portion thereof by means of the third cams to operate the pressurizing roller.

In this case, the driving gear may have a plurality of protrusions protruding from the outer surface thereof in such a way as to be sensed by sensors, and the protrusions may have different lengths along respective circumferential directions, while being formed on different distances in diameter directions from the rotating center of the driving gear and having start and end points different from one another.

Further, the second cams may include the second left cam formed on the center of the inner surface of the driving gear and having a cam-shaped path and the second right cam formed on one side portion of the driven rotating plate, while facing the second left cam, and the third cams may include the third left cam formed on the outside of the second left cam on the inner surface of the driving gear and having a cam-shaped path and the third right cam formed on the other side portion of the driven rotating plate, while facing the third left cam.

Advantageous Effects of the Invention

According to the present invention, the paper feeding control device includes the driving shaft rotating by means of the motor, the plurality of cams interlocking with the driving shaft in such a way as to be controlled simultaneously, and the installation brackets interlocking with the cams. Accordingly, the paper feeding control device according to the present invention performs printing on the printing paper by applying heat to the ink ribbon, performs the de-curling for the printing paper of which printing has been done, and then provides the printing paper to the user.

MODE FOR INVENTION

Hereinafter, an explanation of a paper feeding control device according to an embodiment of the present invention will be given in detail with reference to the attached drawings.

First, a thermal transfer printer 10 to which the paper feeding control device according to the present invention is applied will be explained.

Figure 1:
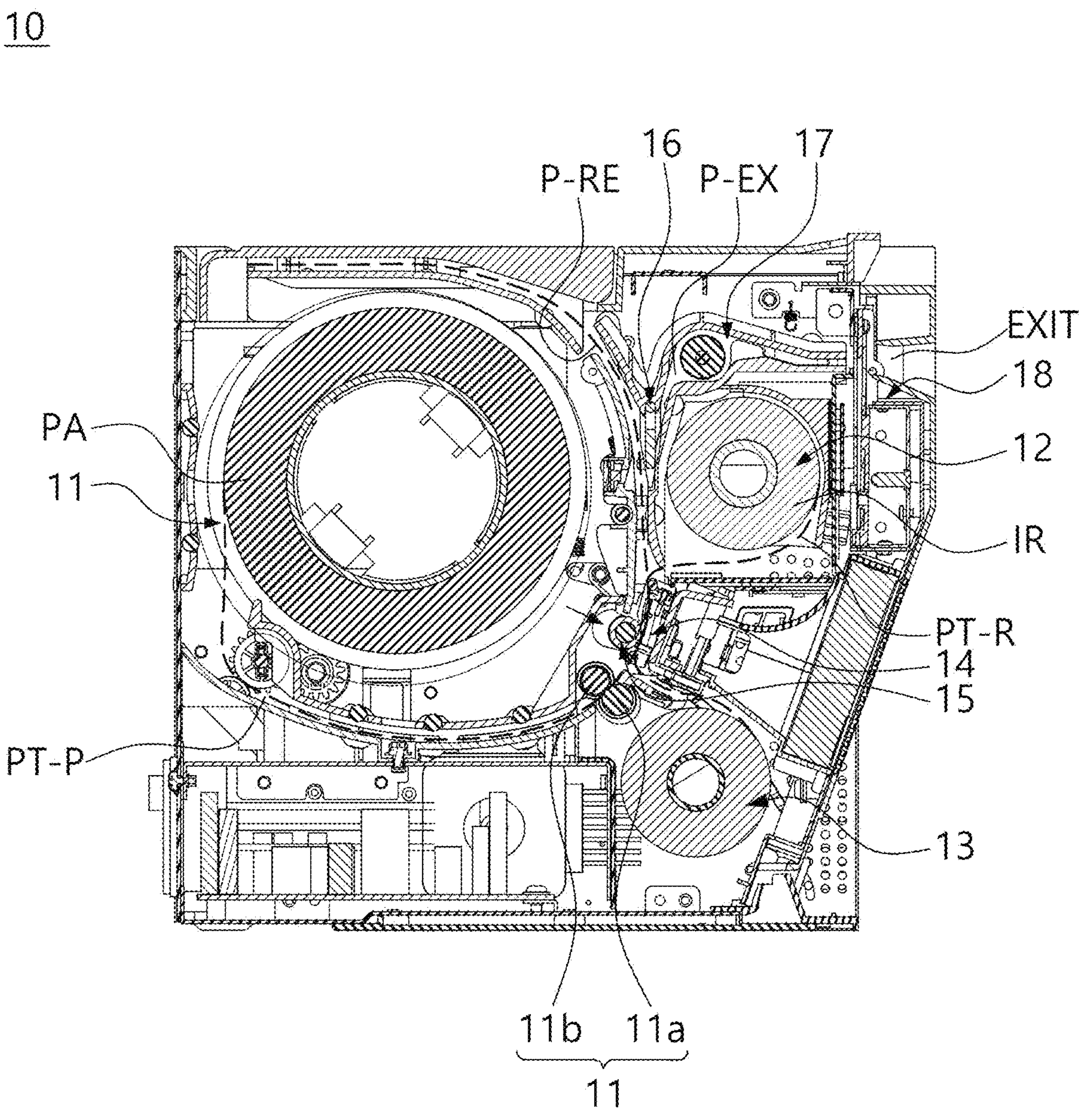
FIG. 1 is a front sectional view showing a paper printing path of a thermal transfer printer.
Figure 2:
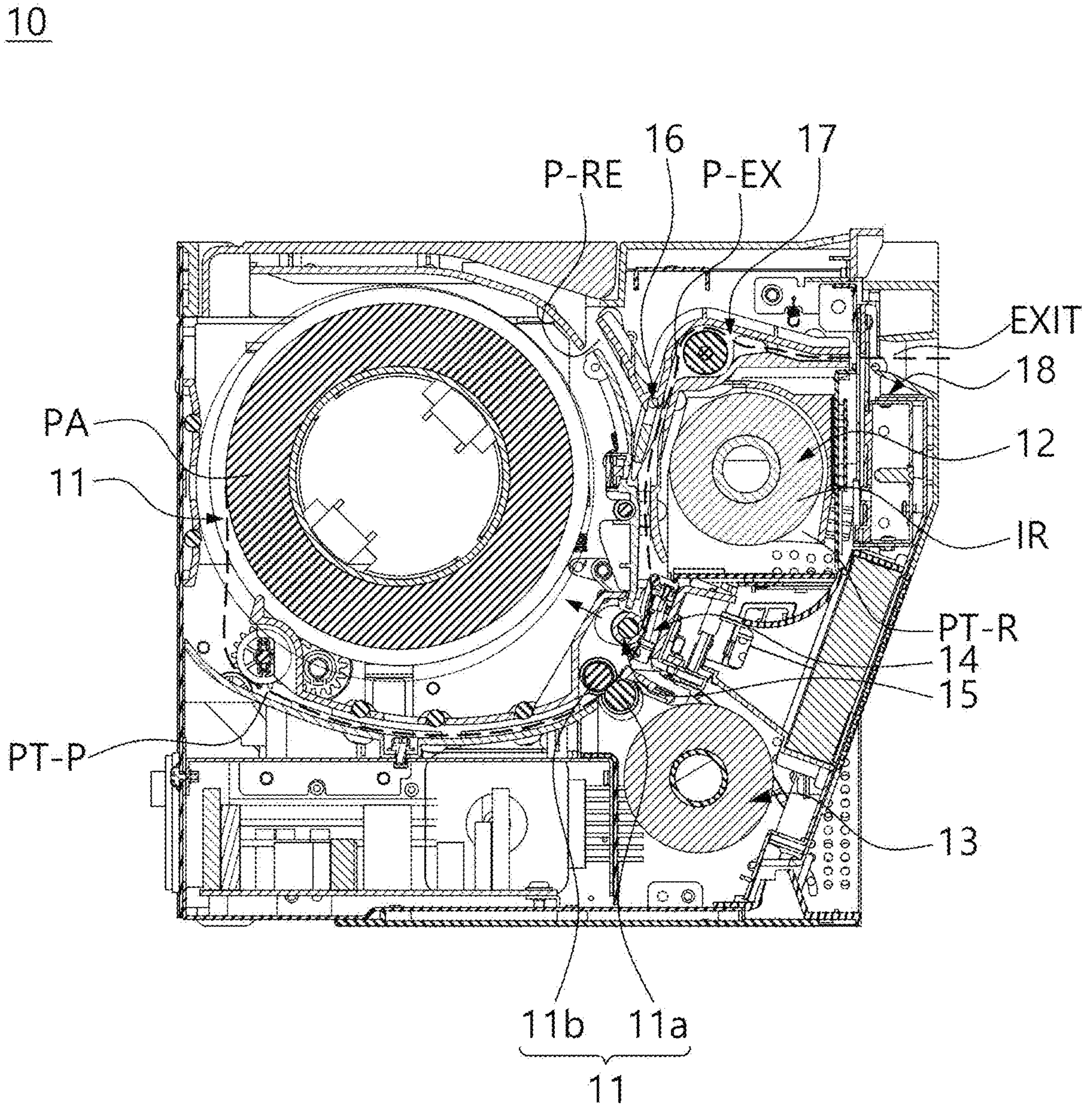
FIG. 2 is a front sectional view showing a paper discharging path of the thermal transfer printer.

FIG. 1 is a front sectional view showing a printing (thermal transfer) state of the thermal transfer printer, and FIG. 2 is a front sectional view showing a de-curling (paper discharging) state of the thermal transfer printer.

As shown, the thermal transfer printer 10 applies heat to an ink ribbon IR through a thermal print head 14 to transfer ink such as dye or pigment applied onto the ink ribbon to printing paper PA, thereby performing printing on the printing paper.

The thermal transfer printer 10 is driven by a printer engine having a motor and gears for printing, thereby performing a printing process, and the printing paper and the ink ribbon as consumables are wound on cartridges and then mounted in a printer housing (printer body).

The printing process largely includes the step of transferring the printing paper and the ink ribbon to the thermal print head 14 to perform printing on the printing paper (See FIG. 1) and the step of de-curling the printing paper whose printing has been done and discharging the printing paper to the outside of the printer body (See FIG. 2).

To distinguish a printing path and a de-curling and discharging path from each other, any one of a first path and a second path is open by the rotation of a diverter 16 located on a branch point, and then, the printing paper moves to the open path, so that the corresponding process is performed.

In this case, the printing paper is fed to the thermal print head 14, together with the ink ribbon. As a pressurizing roller 11*b* moves to come into close contact with a grip roller 11*a*, the printing paper whose feeding is controlled according to the present invention is caught between the pressurizing roller 11*b* and the grip roller 11*a* and thus controlled in the transfer (feed).

Further, the printing paper and the ink ribbon fed come into close contact with the thermal print head 14 by means of a platen roller 15 movable forward and backward. Accordingly, heat is applied to the ink ribbon, and the ink accommodated in the ink ribbon is printed on the printing paper.

To do this, the thermal transfer printer 10 includes a paper cartridge 11, a paper feed path PT-P, a feed roll 12, a winding roll 13, a ribbon feed path PT-R, the thermal print head 14, the platen roller 15, the diverter 16, a de-curler 17, and a cutter 18.

According to an embodiment of the present invention, the paper cartridge 11 is located on one side (on the left side of the drawing) of the printer housing 10 (printer body) in a transverse direction of the printer housing 10, and the feed roll 12 and the winding roll 13 are located on the upper and lower portions of the other side (on the right side of the drawing) thereof.

Further, the thermal print head 14 is placed between the feed roll 12 and the winding roll 13 located on the upper and lower portions of the printer housing 10, and a paper escape path P-RE and a paper exit path P-EX are branched below the diverter 16.

The paper escape path P-RE is formed above the paper cartridge 11, and the paper exit path P-EX is formed above the feed roll 12 located on the upper side of the printer housing 10. That is, a path for branching the paper escape path P-RE and the paper exit path P-EX is formed above the diverter 16.

Further, the paper feeding control device 100 according to the present invention is built on, for example, the thermal transfer printer 10 as mentioned above to control feeding of the printing paper. The feeding of the printing paper includes a feeding speed, a feeding amount (length), and a feeding direction.

Figure 3:
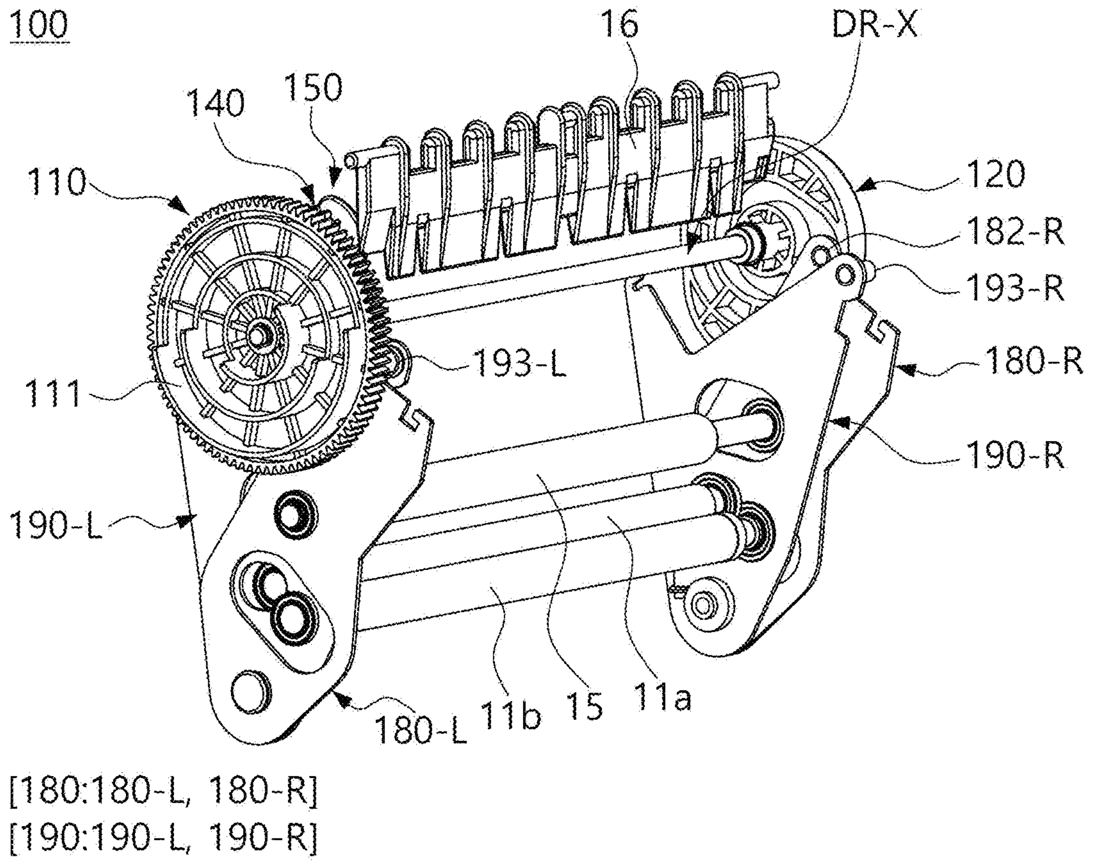
FIG. 3 is a perspective view showing one side of a paper feeding control device according to the present invention.
Figure 4:
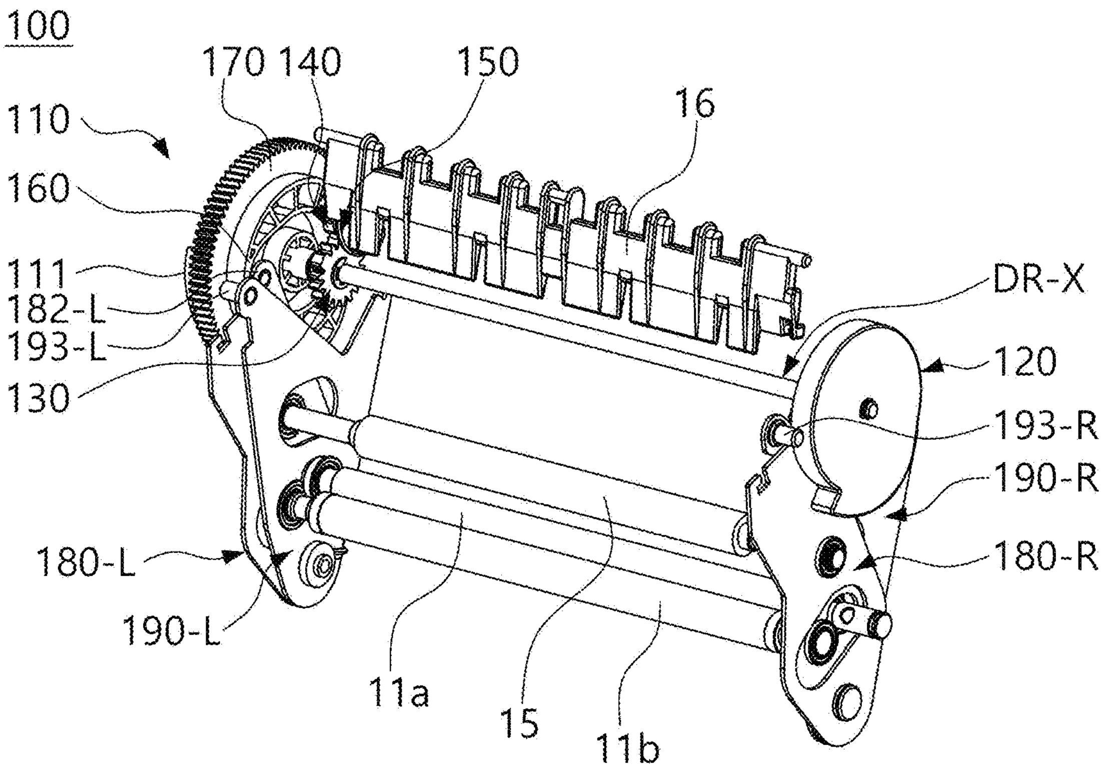
FIG. 4 is a perspective view showing the other side of the paper feeding control device according to the present invention.

As shown in FIGS. 3 and 4, the paper feeding control device 100 according to the present invention includes a driving gear 110, a driving shaft DR-X, a driven rotating plate 120, a shaft gear 130, an idle gear 140, a first cam 150, second cams 122 and 160, third cams 123 and 170, platen brackets 180 (180-L and 180-R), and pressurizing brackets 190 (190-L and 190-R).

In this case, the second cams 122 and 160 are a pair of cams located on left and right sides. That is, the second right cam 122 is located on the driven rotating plate 120, and the second left cam 160 on the driving gear 110. Similarly, the third cams 123 and 170 are a pair of cams located on left and right sides. That is, the third right cam 123 is located on the driven rotating plate 120, and the third left cam 170 on the driving gear 110.

Under the above configuration, the shaft gear 130 rotates through the rotation of the driving shaft DR-X, and through the rotation of the idle gear 140 engaging with the shaft gear 130, the first cam 150 rotates. Accordingly, the diverter 16 rotates by means of the first cam 150 so that the printing paper path branched from the diverter 16 is selected.

Further, if the driving gear 110 rotates by means of a motor (a reference symbol 'M' of FIG. 5), the driven rotating plate 120 rotates through the driving shaft DR-X. Accordingly, the pair of second left and right cams 122 and 160 is driven simultaneously to perform the same operation, and further, the pair of third left and right cams 123 and 170 is driven simultaneously to perform the same operation.

Furthermore, if the platen brackets 180 rotate through the operations of the second cams 122 and 160, the platen roller 15 comes into close contact with the thermal print head 14 to prepare printing, and if the pressurizing brackets 190 rotate through the operations of the third cams 123 and 170, the pressurizing roller 11*b* comes into close contact with the grip roller 11*a* to start feeding of the printing paper.

Figure 5:
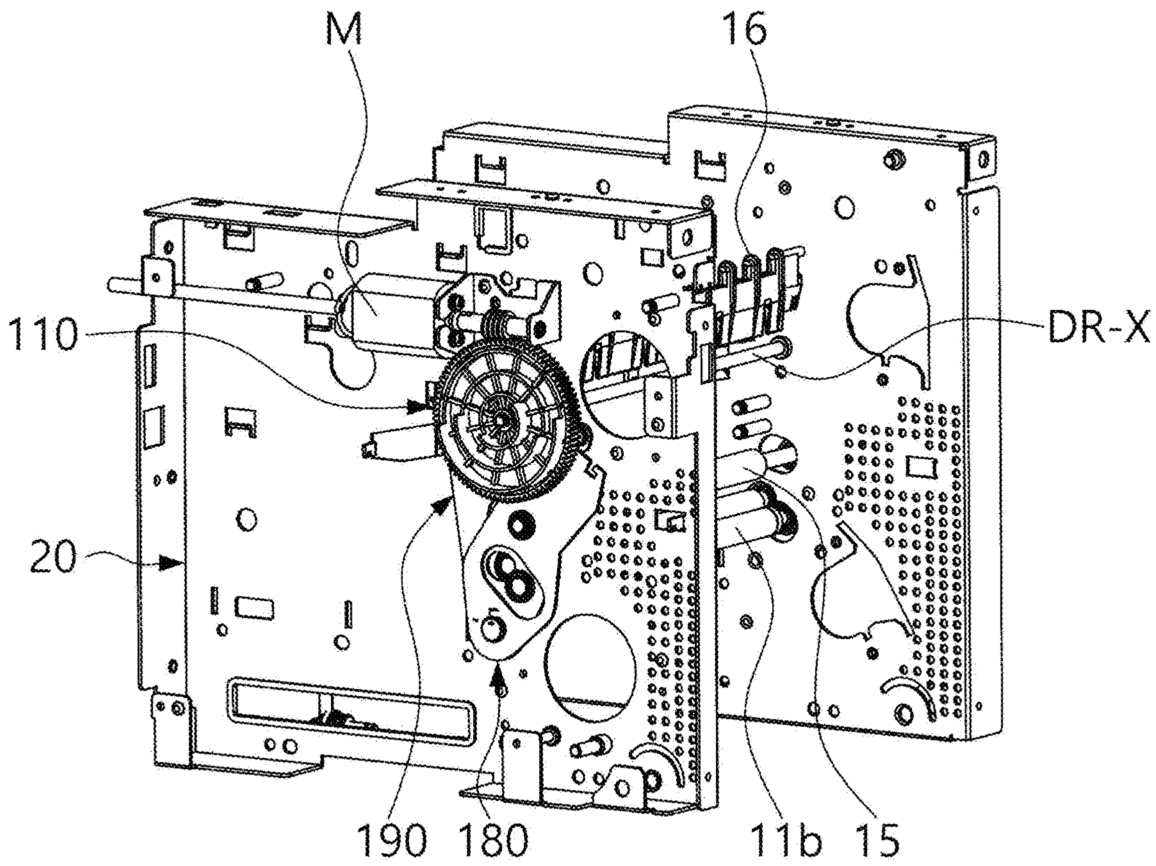
FIG. 5 is a perspective view showing one side of the paper feeding control device according to the present invention that is coupled to an installation frame.
Figure 6:
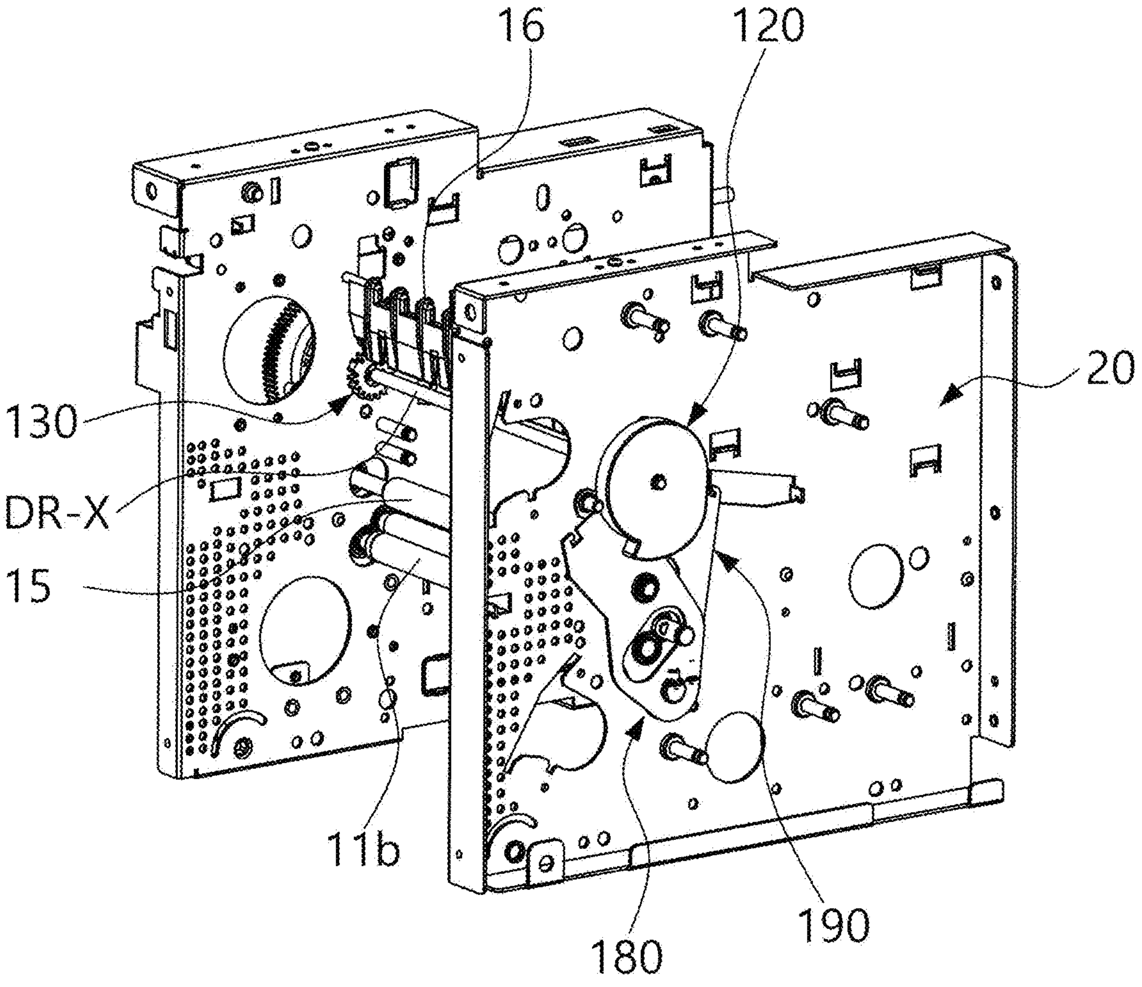
FIG. 6 is a perspective view showing the other side of the paper feeding control device according to the present invention that is coupled to the installation frame.

As shown in FIGS. 5 and 6, the paper feeding control device 100 according to the present invention is built on one pair of printing paper housings spaced apart from each other on left and right sides or on installation frames 20 constituting the respective printing paper housings.

In this case, the driving gear 110 has teeth formed along the outer periphery thereof in such a way as to engage with the gear of the motor M, and further, the driving gear 110 is located on the outside of one of the pair of installation frames 20 and then connected to the motor M.

According to an embodiment of the present invention, the driving gear 110 is a worm wheel as a circular gear having teeth protruding from the outer periphery thereof, and the motor gear is a worm gear having a worm screw connected to the motor M.

The second left cam 160 and the third left cam 170 are located concentrically on the inner surface of the driving gear 110. The second left cam 160 and the third left cam 170 constitute one side of the pair of second cams 122 and 160 and one side of the pair of third cams 123 and 170 and serve to move the platen roller 15 and the pressurizing roller 11*b* to given positions, together with the cams located on the driven rotating plate 120.

Figure 7:
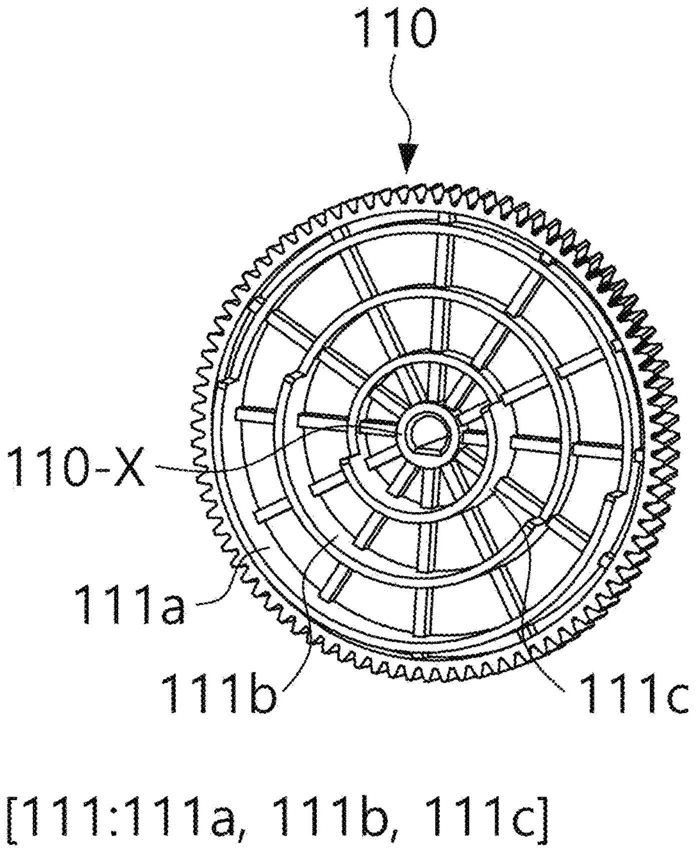
FIG. 7 is a side view showing the outer surface of a driving gear of the paper feeding control device according to the present invention.

As shown in FIG. 7, a plurality of protrusions 111 (111*a*, 111*b*, and 111*c*) protrude from the outer surface of the driving gear 110 in such a way as to be sensed by sensors. The protrusions 111 are sensed by the sensors (reference symbols 'A', 'B', and 'C' of FIGS. 12 to 17), and they have different lengths along respective circumferential directions.

Further, the protrusions 111 are formed on different distances in diameter directions from a rotating center 110-X of the driving gear 110 and their start and end points are different from one another. Accordingly, an amount of rotation of the driving gear 110 is sensed. This will be explained again later.

One side end portion of the driving shaft DR-X is fittedly coupled to the rotating center of the driving gear 110, and as the driving gear 110 rotates, therefore, the driving shaft DR-X rotates.

The driving shaft DR-X is located transversely to pass through the pair of left and right installation frames 20, and the driven rotating plate 120 as will be discussed later is coupled to the other side end portion of the driving shaft DR-X, so that it rotates together with the driving shaft DR-X.

The other side end portion of the driving shaft DR-X is fittedly coupled to the rotating center of the driven rotating plate 120. That is, the driving gear 110 and the driven rotating plate 120 are coupled to both end portions of the driving shaft DR-X, and through the rotation of the driving gear 110, the driving shaft DR-X and the driven rotating plate 120 rotate together.

In detail, the driven rotating plate 120 is located on the opposite side installation frame of the pair of installation frames 20, which faces the driving gear 110, and the driven rotating plate 120 includes the second right cam 122 and the third right cam 123.

Figure 8:
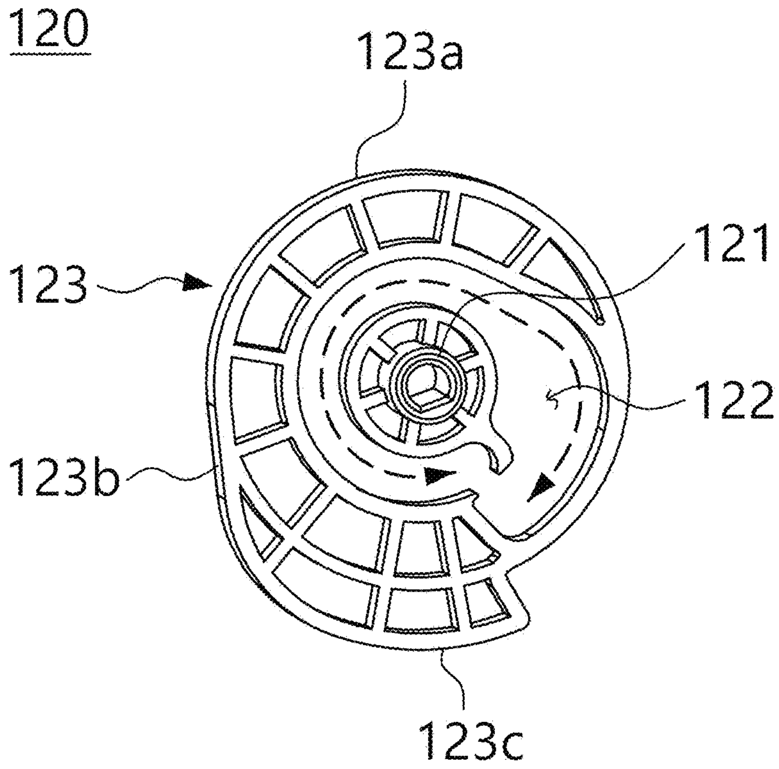
FIG. 8 is a side view showing the inner surface of a driven rotating plate of the paper feeding control device according to the present invention.

As shown in FIG. 8, the second right cam 122 is formed on the inner surface of the driven rotating plate 120 and has a cam-shaped path to which a first platen link 182-R of the platen brackets 180 is fitted. The second right cam 122 and the second left cam 160 perform the same operation as each other, while facing each other.

To do this, the second right cam 122 has a shaft coupling hole 121 formed on the center thereof in such a way as to fit the driving shaft DR-X thereto and a guide frame with a given pattern formed around the shaft coupling hole 121 to provide the cam-shaped path.

The cam-shaped path is formed in a circumferential direction around the shaft coupling hole 121, while being widened or narrow in width according to angles. On a portion where the width of the cam-shaped path is relatively large, the first platen link 182-R is movable outward by means of a spring.

The third right cam 123 is formed continuously along the periphery of the driven rotating plate 120 and has portions whose radiuses are different from the rotating center thereof to pressurize a first pressurizing link 193-R of the pressuring brackets 190.

For example, the third right cam 123 includes a circular portion 123*a*, a linear portion 123*b* having a smaller radius from the shaft coupling hole 121 than the circular portion 123*a*, and a protruding portion 123*c* having a larger radius than the circular portion 123*a*, and the first pressurizing link 193-R is pushed or moved backward according to the pressurizing portions of the third right cam 123 thereagainst.

The third right cam 123 and the third left cam 170 perform the same operation as each other, while facing each other.

Figure 9:
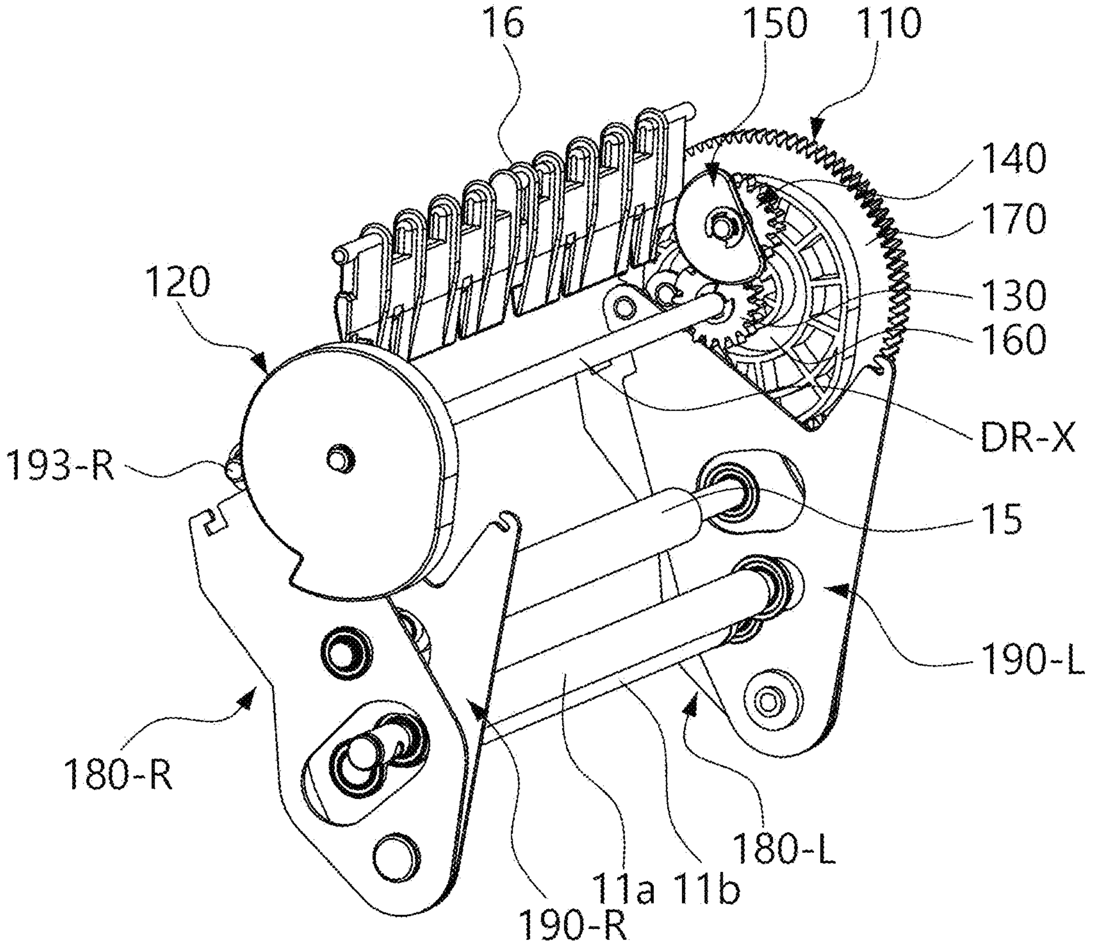
FIG. 9 is a perspective view showing one side of a first cam of the paper feeding control device according to the present invention.

As shown in FIG. 9, the shaft gear 130 rotates the diverter 16. The diverter 16 is located on a branch point formed under the thermal print head 14 (on the upper side of the drawings) and thus guides the printing paper to the first path or the second path.

For example, if the diverter 16 rotates to one side, the second path is closed and the first path is open, so that the printing paper is transferred to the paper escape path P-RE. Contrarily, if the second path is open, the printing paper is transferred to the paper exit path P-EX.

To do this, the shaft gear 130 allows the driving shaft DR-X to be fitted to the rotating center thereof and thus rotates together with the driving shaft DR-X. That is, as the driving shaft DR-X is fitted to the shaft gear 130 and thus passes through the shaft gear 130, the shaft gear 130 is coupled to the driving shaft DR-X.

In this case, the idle gear 140 engages with the shaft gear 130 and thus rotates. According to an embodiment of the present invention, the shaft gear 130 and the idle gear 140 are spur gears having the teeth parallel to the shafts, and in this case, they are adjacent to each other, while being parallel to each other.

The first cam 150 is coupled to the inner surface of the idle gear 140 in such a way as to rotate together with the idle gear 140 and serves to change the rotational direction of the diverter 16 selecting the transfer path of the printing paper according to the rotating angle thereof. For example, the first cam 150 has a circular portion having a relatively large radius and a linear portion having a relatively small radius and serves to push or move backward the diverter 16.

Figure 10:
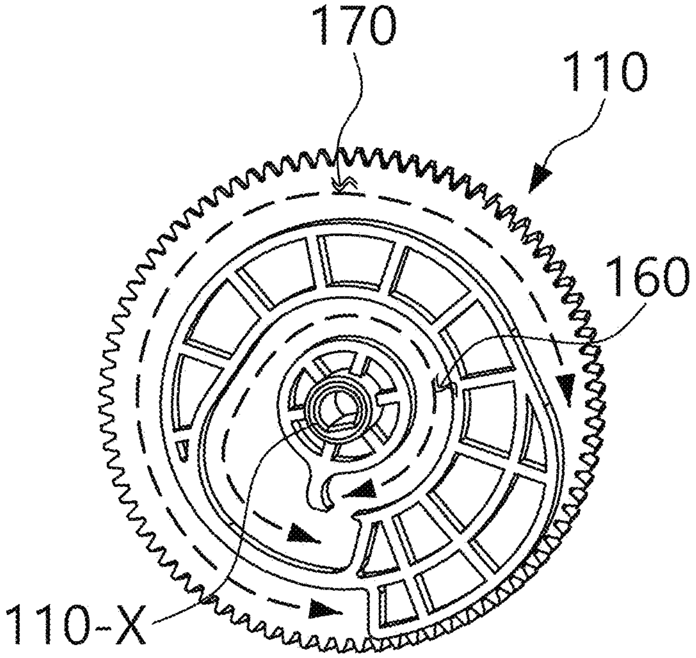
FIG. 10 is a front view showing a second left cam and a third left cam located on the inner surface of the driving gear of the paper feeding control device according to the present invention.

As shown in FIG. 10, the second left cam 160 is formed on the center of the inner surface of the driving gear 110 and has a cam-shaped path. The driving gear 110 has a shaft coupling hole 110-X formed on the center thereof in such a way as to fit the driving shaft DR-X thereto, and the second left cam 160 has a guide frame with a given pattern formed around the shaft coupling hole 110-X to provide the cam-shaped path.

The cam-shaped path is formed in a circumferential direction around the shaft coupling hole 110-X, while being widened or narrow in width according to angles. On a portion where the width of the cam-shaped path is relatively large, a second platen link 182-L is movable outward by means of a spring.

The third left cam 170 is formed along the outer periphery of the second left cam 160 on the inner surface of the driving gear 110 and has a cam-shaped path. The cam-shaped path constituting the third left cam 170 is determined together with that of the second left cam 160 so that the guide frame for forming the second left cam 160 is adjusted in shape.

Like this, the driven rotating plate 120 to the third left cam 170 as mentioned above desirably allow their rotating center to be placed coaxially with the driving shaft DR-X. As a result, the plurality of cams are driven simultaneously through the driving shaft DR-X, thereby reducing the number of parts of the device and being simplified in configuration of the device.

Further, the platen brackets 180 serve to operate the platen roller 15 and rotate in forward and backward directions through the rotations of the second right cam 122 and the second left cam 160 to allow the platen roller 15 to come into close contact with the thermal print head 14 or to be distant therefrom.

To do this, the platen brackets 180 are one pair of brackets rotatably coupled to both ends of the platen roller 15. That is, the platen brackets 180 include the first platen bracket 180-R located on one side end portion of the platen roller 15 and the second platen bracket 180-L located on the other side end portion of the platen roller 15.

In this case, each platen bracket 180 allows an upper end portion thereof to rotate with respect to a rotating center point 181 formed on a lower end portion thereof, and the first platen link 182-R is fitted to one side platen bracket 180 (that is, the first platen bracket 180-R) in such a way as to move along the cam-shaped path of the second right cam 122 formed on the inner surface of the driven rotating plate 120.

Similarly, the second platen link 182-L is fitted to the other side platen bracket 180 (that is, the second platen bracket 180-L) in such a way as to move along the cam-shaped path of the second left cam 160 formed on the inner surface of the driving gear 110.

Figure 11A:
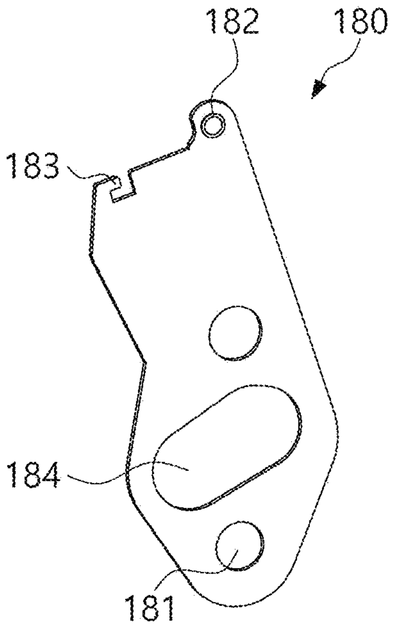
FIGS. 11A-11B are front views showing brackets of the paper feeding control device according to the present invention.

In more detail, as shown in FIG. 11A, each platen bracket 180 has platen installation portions formed on the upper portion thereof in forward and backward directions, and the first platen link 182-R and the second platen link 182-L are fitted to the front side platen installation portions of the first platen bracket 180-R and the second platen bracket 180-L.

The first platen link 182-R and the second platen link 182-L have the shapes of protrusions protruding from the platen brackets 180 by given lengths in such a way as to be fitted to the platen brackets 180, and they are fitted to the cam-shaped paths and thus move along the corresponding paths through the rotations of the cams.

Contrarily, an elastic spring is connected to a hook 183 formed on the rear side platen installation portion to perform a pulling operation. Therefore, if a force caused by the cam is not applied, the platen bracket 180 rotates backward, and through the operation of the cam, contrarily, it moves forward.

Further, the platen bracket 180 has a long hole 184 formed between the rotating center point 181 and the platen installation portions in such a way as to insert the pressurizing roller 11*b* mounted on the pressurizing brackets 190. The long hole 184 extends according to the rotational direction of the platen bracket 180.

The pressurizing brackets 190 serve to operate the pressurizing roller 11*b* and thus rotate in forward and backward directions through the rotations of the third right cam 123 and the third left cam 170 to allow the pressurizing roller 11*b* to come into close contact with the grip roller 11*a* (so that the paper is transferred) or to be distant therefrom (so that paper transferring is stopped).

To do this, the pressurizing brackets 190 are one pair of brackets rotatably coupled to both ends of the pressurizing roller 11*b*. That is, the pressurizing brackets 190 include the first pressurizing bracket 190-R located on one side end portion of the pressurizing roller 11*b* and the second pressurizing bracket 190-L located on the other side end portion of the pressurizing roller 11*b*.

In this case, each pressurizing bracket 190 allows an upper end portion thereof to rotate with respect to a rotating center point 191 formed on a lower end portion thereof, and the first pressurizing link 193-R is fitted to one side pressurizing bracket 190 (that is, the first pressurizing bracket 190-R) in such a way as to be pressurized according to the rotational angle of the third right cam 123 formed on the periphery of the driven rotating plate 120.

Similarly, the second pressurizing link 193-L is fitted to the other side pressurizing bracket 190 (that is, the second pressurizing bracket 190-L) in such a way as to move along the cam-shaped path of the third left cam 170.

Figure 11B:
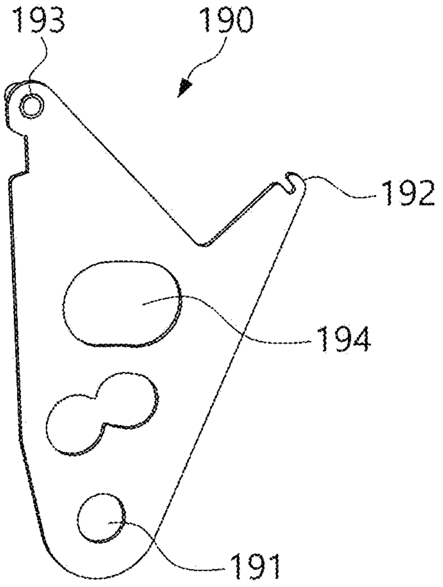

In more detail, as shown in FIG. 11B, each pressurizing bracket 190 has installation portions formed on the upper portion thereof in forward and backward directions, and an elastic spring is connected to a hook 192 formed on the front side installation portion to perform a pulling operation.

Contrarily, the first pressurizing link 193-R and the second pressurizing link 193-L are fitted to the rear side installation portions of the first pressurizing bracket 190-R and the second pressurizing bracket 190-L. Therefore, if a force caused by the cam is not applied, the pressurizing bracket 190 rotates forward, and through the operation of the cam, further, the pressurizing bracket 190 moves backward.

Further, the pressurizing bracket 190 has a long hole 194 formed between the rotating center point 191 and the installation portions in such a way as to insert the platen roller 15 mounted on the platen brackets 180. The long hole 194 extends according to the rotational direction of the pressurizing bracket 190.

Under the above-mentioned configuration, hereinafter, an explanation of the operational states of the paper feeding control device according to the present invention will be given in printing order.

However, the rotation control angle of the driving gear and the operating order or rotational amount of the driving gear caused thereby may be freely changed in consideration of the arranged states or diameters of the thermal print head, the cartridges, and the transfer roller in the thermal transfer printer to which the paper feeding control device of the present invention is applied.

Figure 12A:
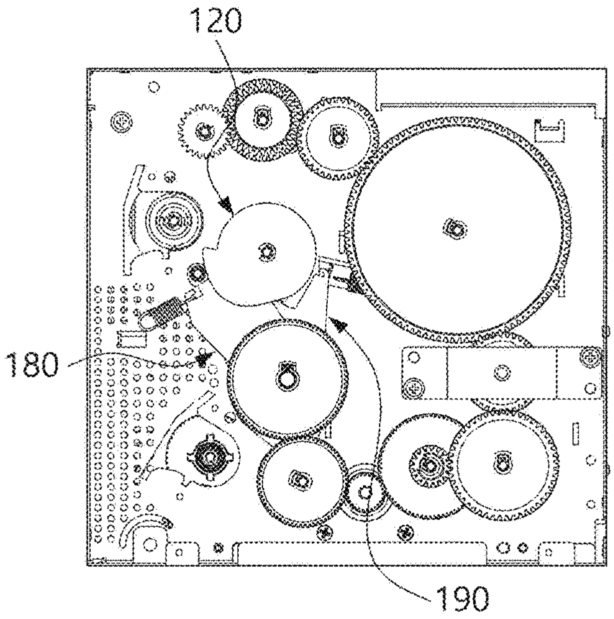
FIGS. 12A-12C to 17 are side views showing operational states of the paper feeding control device according to the present invention.
Figure 12B:
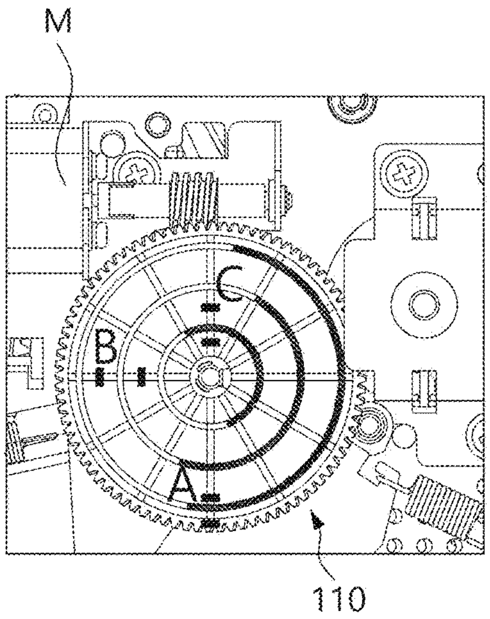
Figure 12C:
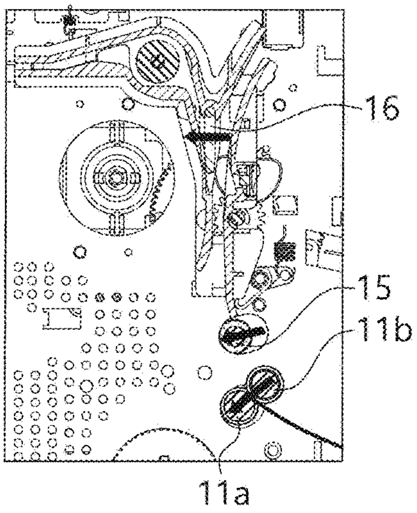

FIGS. 12A-12C show a step of preparing an operation after a cartridge on which roll type printing paper is wound has been mounted in the thermal transfer printer.

FIGS. 12A to 12C are front views showing the driven rotating plate 120 (bracket operations), the driving gear 110 (sensing of sensors), and the diverter 16 (paper path).

As shown, a top cover of the thermal transfer printer 10 is open, and then, the cartridge onto which the roll type printing paper is wound is mounted onto the thermal transfer printer 10, thereby preparing a printing process.

In this case, three sensors are provided. According to an embodiment of the present invention, the first sensor A is fixedly located at a six o'clock position, the second sensor B at a nine o'clock position, and the third sensor C at a 12 o'clock position.

The sensors serve to sense the plurality of protrusions 111 spaced apart from one another sequentially in the diameter directions from the center of the driving gear 110, and the first to third sensors detect the protrusions 111*a*, 111*b*, and 111*c* corresponding thereto, respectively.

Further, if the protrusions 111 are located between a pair of sensor modules, they are sensed to read the rotational angle of the driving gear 110. To do this, each sensor module has a light emitting sensor and a light receiving sensor.

Referring to FIGS. 12A-12C, the protrusions 111 are located between the pair of modules of the first sensor A, so that the first sensor A is turned off, and the protrusions 111 are not located between the pair of modules of the second sensor B, so that the second sensor B is turned on. In the same manner as above, the third sensor C is turned off.

In this case, the engine of the thermal transfer printer 10 allows the motor M or the thermal print head 14 to be kept stopped, so that the motor M or the thermal print head 14 are ready to operate.

Further, the pressurizing roller 11*b* does not operate correspondingly to the current state (rotational angle) of the driving gear 110. Accordingly, the pressurizing roller 11*b* is pulled distant from the grip roller 11*a* by means of the spring, so that the printing paper passes through the space between the pressurizing roller 11*b* and the grip roller 11*a*.

Simultaneously, the platen roller 15 operates and comes into close contact with the thermal print head 14.

Figure 13A:
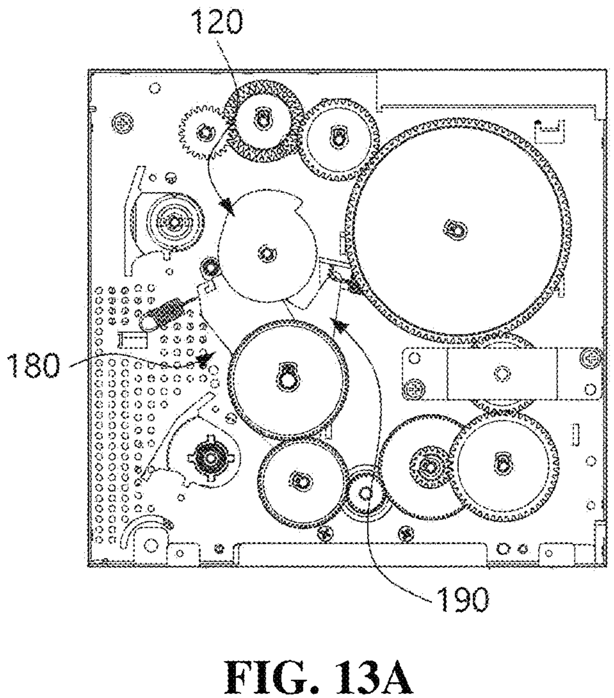
Figure 13B:
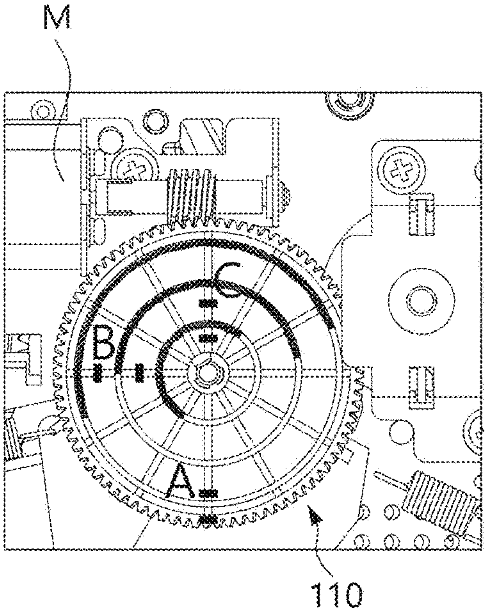
Figure 13C:
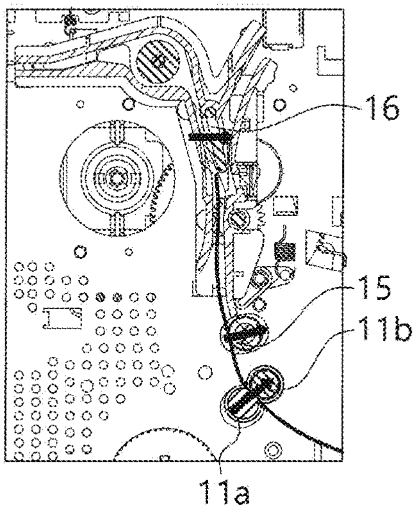

Next, FIGS. 13A-13C show an operation for checking a right position before paper feeding, which is a paper feeding and sensor sensing step.

As shown in FIGS. 13A to 13C, as the driving gear 110 rotates, the first sensor A is turned on, the second sensor B is turned off, and the third sensor C is turned off.

In this case, the pressurizing roller 11*b* operates correspondingly to the current state (rotational angle) of the driving gear 110. Accordingly, the pressurizing roller 11*b* comes into close contact with the grip roller 11*a*, so that the printing paper inserted between the space between the pressurizing roller 11*b* and the grip roller 11*a* is held and transferred.

Simultaneously, the platen roller 15 does not operate and is thus distant from the thermal print head 14 by means of the spring. Therefore, printing is not performed.

Figure 14A:
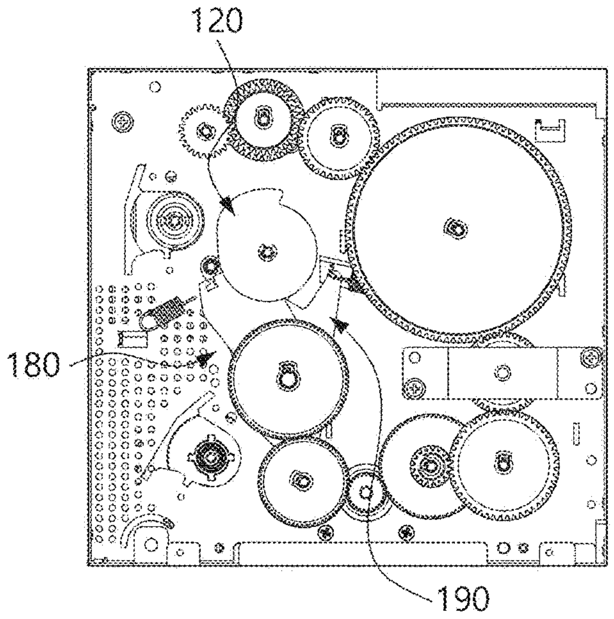
Figure 14B:
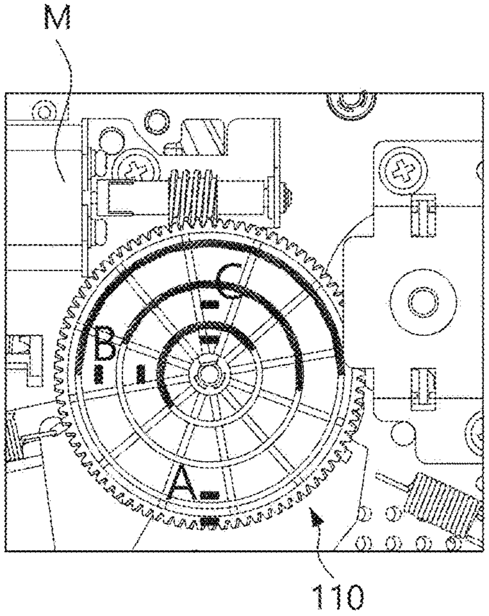
Figure 14C:
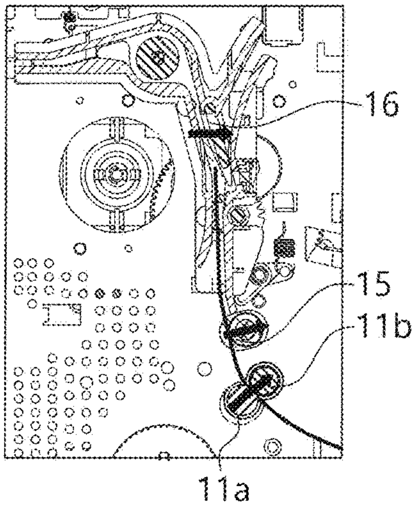

Next, FIGS. 14A-14C show an operation for transferring the printing paper to the top side guide sensor to allow the printing paper to pass through the diverter 16 so that the length of the printing paper for printing is sensed, which is a paper feeding and sensor sensing step.

As shown in FIGS. 14A to 14C, as the driving gear 110 rotates, the first sensor A is turned on, the second sensor B is turned on, and only the third sensor C is turned off.

In this case, the pressurizing roller 11*b* operates correspondingly to the current state (rotational angle) of the driving gear 110. Accordingly, the pressurizing roller 11*b* comes into close contact with the grip roller 11*a*, so that the printing paper inserted between the space between the pressurizing roller 11*b* and the grip roller 11*a* is held and transferred by a given length.

Simultaneously, the platen roller 15 does not operate and is thus distant from the thermal print head 14 by means of the spring. Therefore, printing is not performed.

After that, FIG. 15 shows a first operation of the diverter 16, which checks a transfer direction of the printing paper before printing starts.

Figure 15A:
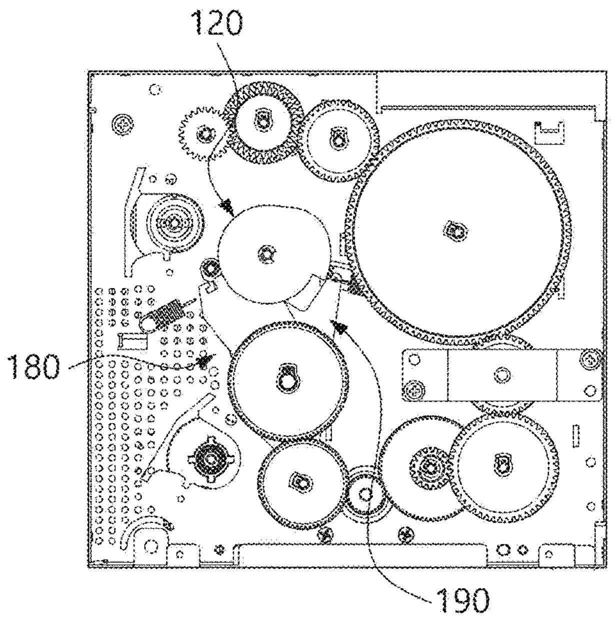
Figure 15B:
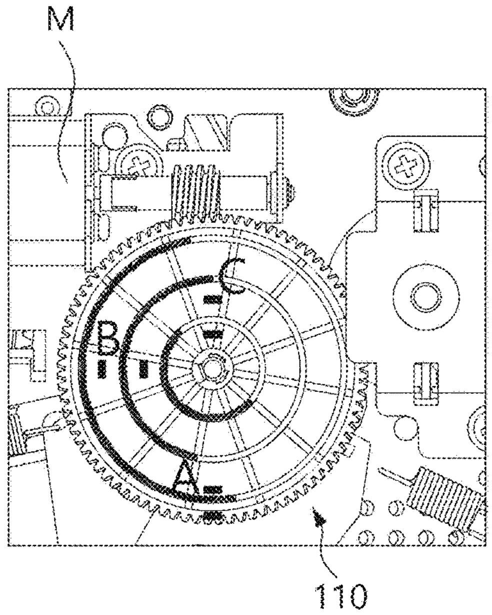
Figure 15C:
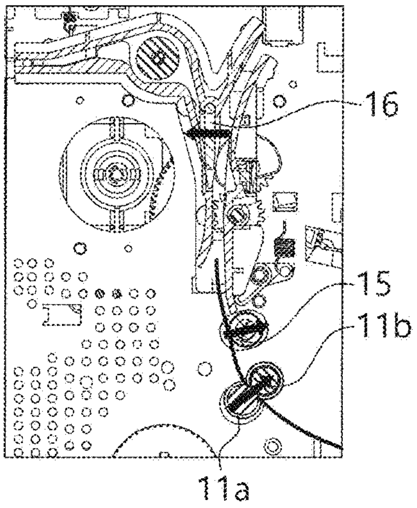

As shown in FIGS. 15*a* to 15*c*, as the driving gear 110 rotates, the first sensor A is turned off, the second sensor B is turned off, and only the third sensor C is turned on.

In this case, the pressurizing roller 11*b* operates correspondingly to the current state (rotational angle) of the driving gear 110. Accordingly, the pressurizing roller 11*b* comes into close contact with the grip roller 11*a*, so that the printing paper inserted between the space between the pressurizing roller 11*b* and the grip roller 11*a* is transferred.

Simultaneously, the platen roller 15 does not operate and is thus distant from the thermal print head 14 by means of the spring. Therefore, printing is not performed.

Figure 16A:
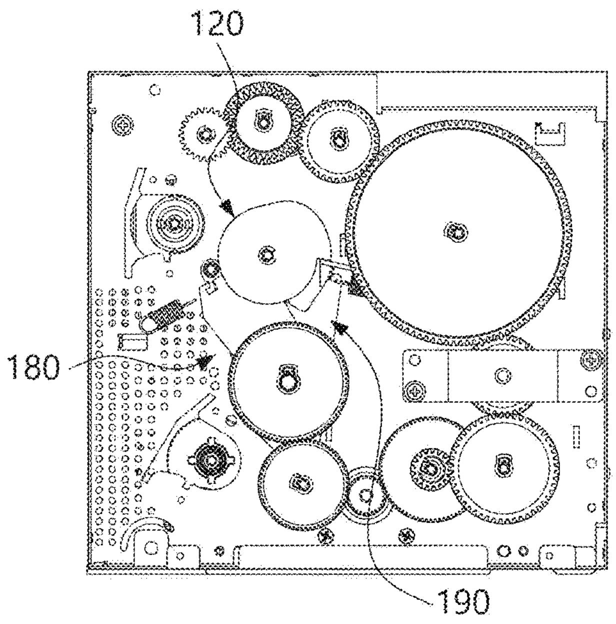
Figure 16B:
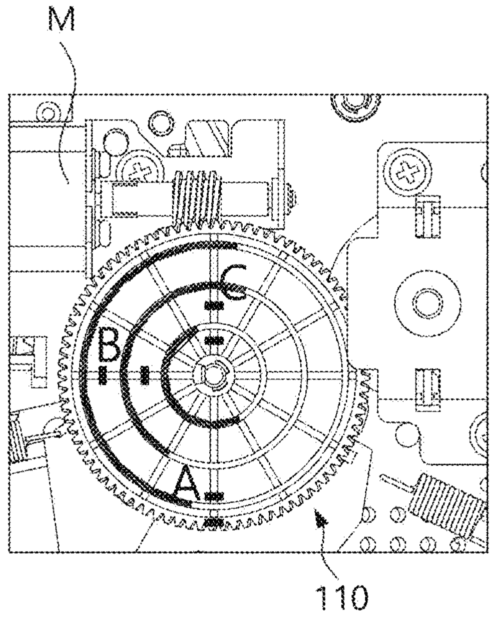
Figure 16C:
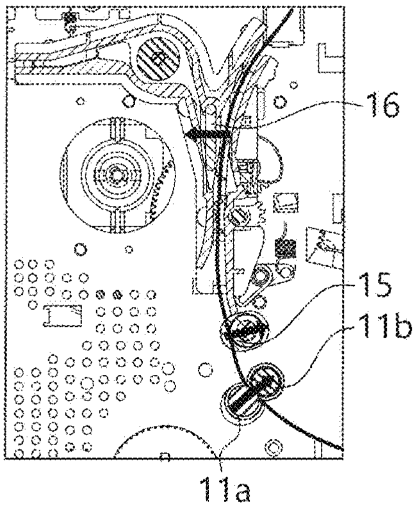

Next, FIGS. 16A-16C show a second operation of the diverter 16, which is a state where the printing paper is converted into a printable path and a final position is checked.

As shown in FIGS. 16A to 16C, as the driving gear 110 rotates, the first sensor A is turned on, the second sensor B is turned off, and the third sensor C is turned on.

In this case, the pressurizing roller 11*b* operates correspondingly to the current state (rotational angle) of the driving gear 110. Accordingly, the pressurizing roller 11*b* comes into close contact with the grip roller 11*a*, so that the printing paper inserted between the space between the pressurizing roller 11*b* and the grip roller 11*a* is held and transferred to a right position for printing.

Simultaneously, the platen roller 15 does not operate and is thus distant from the thermal print head 14 by means of the spring. Therefore, printing is not performed yet.

Figure 17A:
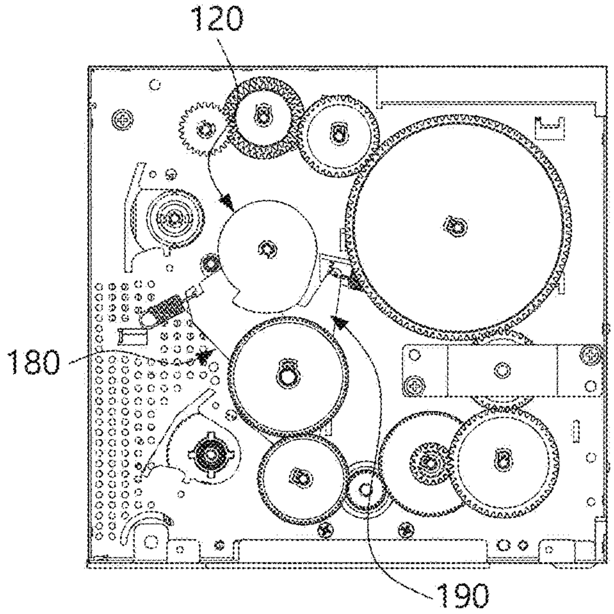
Figure 17B:
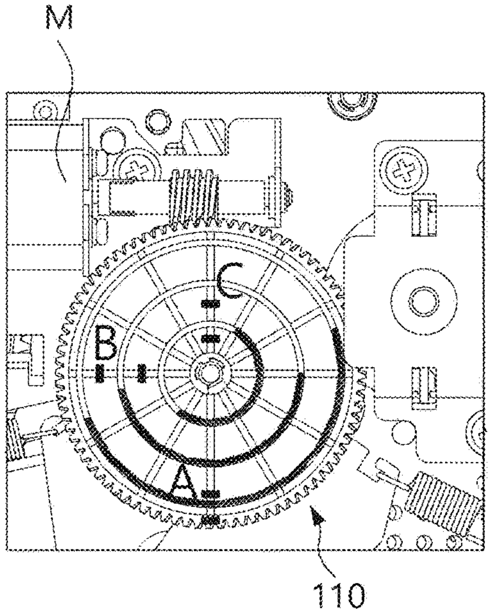
Figure 17C:
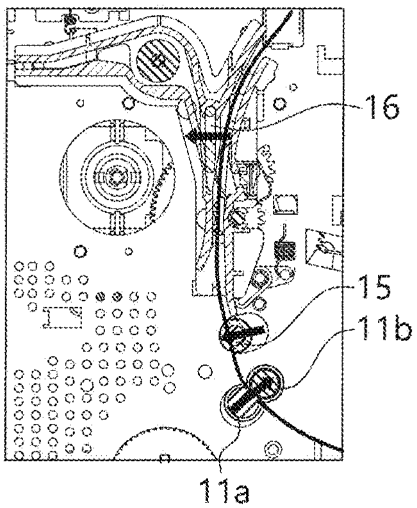

Next, FIGS. 17A-17C show a printing state where the thermal print head 14 operates (is heated) to start printing.

As shown in FIGS. 17A to 17C, as the driving gear 110 rotates, the first sensor A is turned off, the second sensor B is turned on, and the third sensor C is turned on.

In this case, the pressurizing roller 11*b* operates correspondingly to the current state (rotational angle) of the driving gear 110. Accordingly, the pressurizing roller 11*b* comes into close contact with the grip roller 11*a*, so that the printing paper inserted between the space between the pressurizing roller 11*b* and the grip roller 11*a* reciprocates in forward and backward directions by a length corresponding to a printing area programmed.

Simultaneously, the platen roller 15 operates and thus moves to the thermal print head 14 to allow the printing paper to come into close contact with the thermal print head 14, together with the ink ribbon. Therefore, printing is performed on the printing paper.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

According to the present invention, the paper feeding control device controls the feeding and the transfer path of the printing paper in the thermal transfer printer for applying heat to the ink ribbon to perform printing on the printing paper, thereby being applicable in industrial fields.

The invention claimed is:

1. A paper feeding control device for controlling feeding of printing paper in a thermal transfer printer, comprising:

a driving gear (110) having teeth formed along the outer periphery thereof in such a way as to engage with a motor gear;

a driving shaft (DR-X) whose one side end portion fittedly coupled to a rotating center of the driving gear (110);

a driven rotating plate (120) having a rotating center to which the other side end portion of the driving shaft (DR-X) is fittedly coupled;

a shaft gear (130) having a rotating center through which the driving shaft (DR-X) fittedly passes in such a way as to rotate together with the driving shaft (DR-X);

an idle gear (140) engaging with the shaft gear (130) and thus rotating;

a first cam (150) coupled to the idle gear (140) in such a way as to rotate together with the idle gear (140) and adapted to change the rotational direction of a diverter (16) selecting a transfer path of the printing paper according to the rotating angle thereof;

a pair of second right and left cams (122 and 160) located on one side of the driving gear (110) and on one side of the driven rotating plate (120) to perform the same operation as each other;

a pair of third right and left cams (123 and 170) located on the other side of the driving gear (110) and on the other side of the driven rotating plate (120) to perform the same operation as each other;

a pair of platen brackets (180) rotatably coupled to both ends of a platen roller (15) in such a way as to allow an upper end portion thereof to rotate around a rotating center point formed on a lower end portion thereof by means of the second cams (122 and 160) to operate the platen roller (15); and a pair of pressurizing brackets (190) rotatably coupled to both ends of a pressurizing roller (11*b*) in such a way as to allow an upper end portion thereof to rotate around a rotating center point formed on a lower end portion thereof by means of the third cams (123 and 170) to operate the pressurizing roller (11*b*).

2. The paper feeding control device according to claim 1, wherein the driving gear (110) has a plurality of protrusions (111) protruding from the outer surface thereof in such a way as to be sensed by sensors (A, B, and C), and the protrusions (111) have different lengths along respective circumferential directions, while being formed on different distances in diameter directions from the rotating center of the driving gear (110) and having start and end points different from one another.

3. The paper feeding control device according to claim 2, wherein the second cams (122 and 160) comprise:

the second left cam (160) formed on the center of the inner surface of the driving gear (110) and having a cam-shaped path; and the second right cam (122) formed on one side portion of the driven rotating plate (120), while facing the second left cam (160), and the third cams (123 and 170) comprise:

the third left cam (170) formed on the outside of the second left cam (160) on the inner surface of the driving gear (110) and having a cam-shaped path; and the third right cam (123) formed on the other side portion of the driven rotating plate (120), while facing the third left cam (170).

4. The paper feeding control device according to claim 3, wherein the rotating centers of the second right cam (122), the second left cam (160), the third right cam (123), and the third left cam (170) are placed coaxially with the driving shaft (DR-X).

5. The paper feeding control device according to claim 3, wherein the platen brackets (180) are rotatably coupled to both ends of the platen roller (15) in such a way as to allow upper end portions thereof to rotate around rotating center points formed on lower end portions thereof, while comprising a first platen link (182-R) driven by means of the second right cam (122) and a second platen link (182-L) driven by means of the second left cam (160), and the pressurizing brackets (190) are rotatably coupled to both ends of the pressurizing roller (11*b*) in such a way as to allow upper end portions thereof to rotate around rotating center points formed on lower end portions thereof, while comprising a first pressurizing link (193-R) driven by means of the third right cam (123) and a second pressurizing link (193-L) driven by means of the third left cam (170).

6. The paper feeding control device according to claim 5, wherein the second right cam (122) is formed on the inner surface of the driven rotating plate (120) to provide the cam-shaped path to which the first platen link (182-R) of the platen brackets (180) is fitted, and the third right cam (123) is formed continuously along the periphery of the driven rotating plate (120) to provide portions whose radiuses are different from the rotating center thereof to pressurize the first pressurizing link (193-R) of the pressuring brackets (190).

7. The paper feeding control device according to claim 5, wherein the platen brackets (180) comprise platen installation portions formed on the upper portions thereof in forward and backward directions, so that the first platen link (182-R) and the second platen link (182-L) are fitted to the front side platen installation portions of the platen brackets (180) and platen springs are connected to the rear side platen installation portions thereof to perform pulling operations, and long holes (184) formed between the rotating center points (181) and the platen installation portions in such a way as to insert the pressurizing roller (11*b*) mounted on the pressurizing brackets (190).

8. The paper feeding control device according to claim 5, wherein the pressurizing brackets (190) comprise installation portions formed on the upper portions thereof in forward and backward directions, so that elastic springs are connected to the front side installation portions thereof to perform pulling operations and the first pressurizing link (183-R) and the second pressurizing link (193-L) are fitted to the rear side installation portions thereof, and long holes (194) formed between the rotating center points (191) and the installation portions in such a way as to insert the platen roller (15) mounted on the platen brackets (180).

* * * * *